W. L. BLISS.
DRIVING MECHANISM FOR AXLE DRIVEN DYNAMOS.
APPLICATION FILED APR. 11, 1903.
1,013,925.
Patented Jan. 9, 1912.
2 SHEETS—SHEET 1.
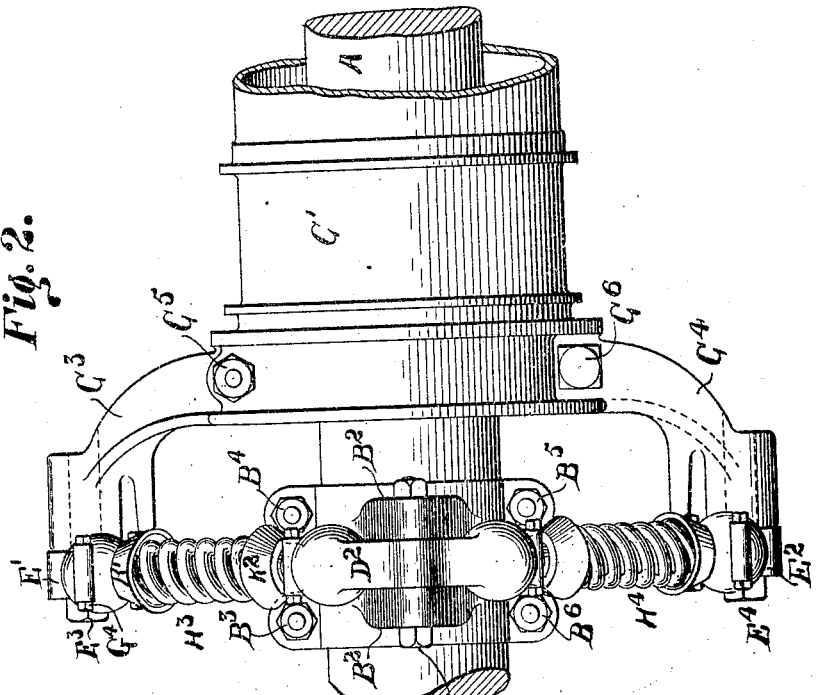
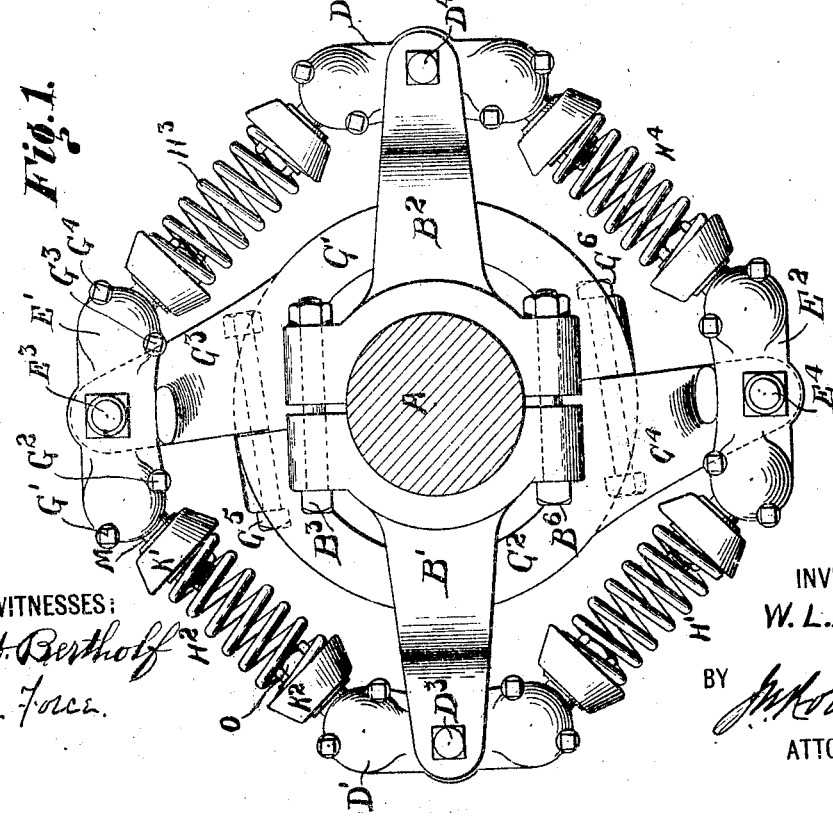
WITNESSES:
C. H. Bertholf
Chas. Force.
INVENTOR
W. L. Bliss.
BY
J. K. Robertson
ATTORNEY

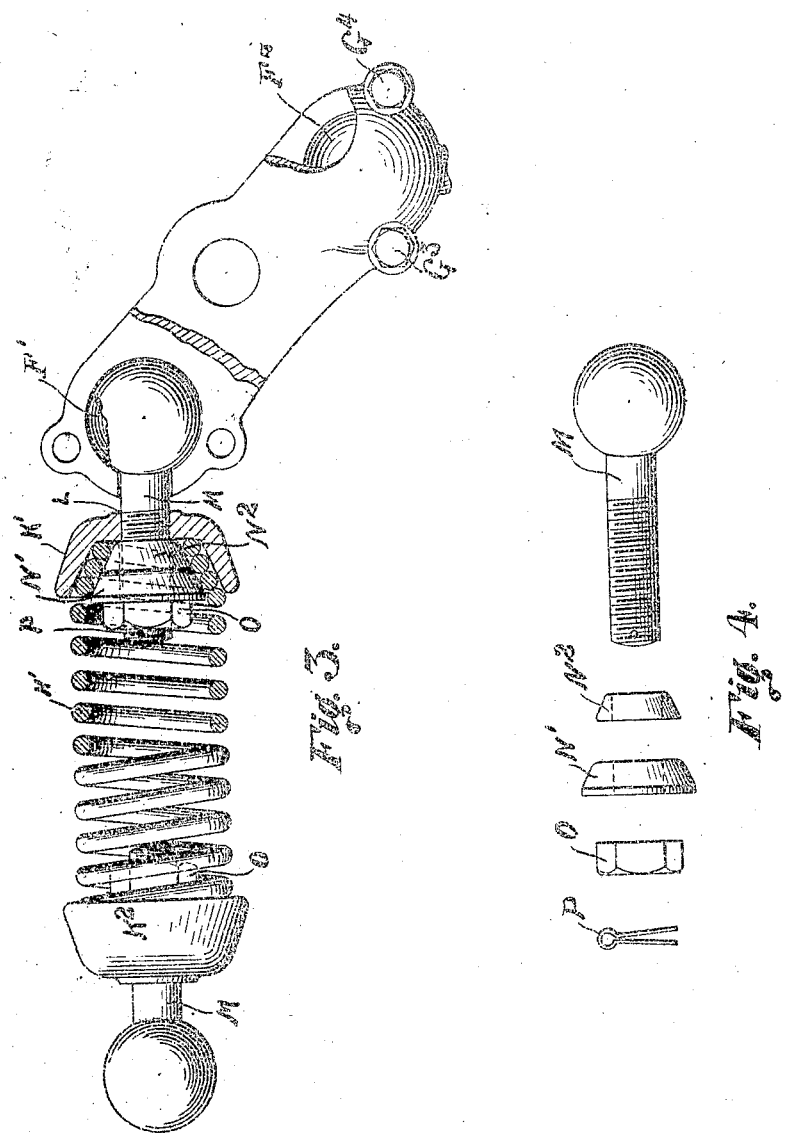

UNITED STATES PATENT OFFICE.

WILLIAM LORD BLISS, OF NEW YORK, N. Y., ASSIGNOR, BY MESNE ASSIGNMENTS, TO THE UNITED STATES LIGHT AND HEATING COMPANY, OF NEW YORK, N. Y., A CORPORATION OF MAINE.

DRIVING MECHANISM FOR AXLE-DRIVEN DYNAMOS.

1,013,925.      Specification of Letters Patent.      Patented Jan. 9, 1912.

Application filed April 11, 1903. Serial No. 152,130.

*To all whom it may concern:*

Be it known that I, WILLIAM LORD BLISS, a citizen of the United States, residing in the borough of Brooklyn, in the city of New York and State of New York, have invented new and useful Improvements in Driving Mechanisms for Axle-Driven Dynamos, of which the following is a specification.

My invention pertains to the lighting of railroad cars by electricity generated by the motion of the same, and its object is to provide a simple, reliable and flexible connection between the axle of a railroad car and a hollow shaft surrounding and spaced from said axle and supported in bearings carried upon the truck.

Generating electricity by power taken from the axle of a railroad car has been undergoing development for many years and the state of the art shows that the mechanical devices which have been adopted to utilize this power, consist principally of belts between a pulley on said axle and one upon the armature of an adjacent dynamo electric machine or generator. They have not given satisfactory service for several reasons. My invention of a hollow shaft surrounding the axle and driven by the same, which I patented June 20, 1899, No. 627,291, gives excellent results in practice, and the present improvements relate more particularly to the means by which said axle and hollow shaft are connected.

Referring to the drawings, it will be seen that the present arrangement, selected for the purpose of illustrating one embodiment of the invention, consists of a two armed dog clamped upon the car axle and four specially constructed driving springs, which connect the ends of said dog to two horns or crank arms on the hollow shaft. The novel features of this construction, which I now desire to explain and patent, consist of the peculiar construction of said driving springs and their method of engagement with the arms of the dog and hollow shaft.

Figure 1 is an end elevation of the device, while Fig. 2 is a side elevation of the same. Figs. 3 and 4 illustrate details of the construction of the springs and the ball and socket fastenings with which they are furnished.

Describing the drawings, A is the axle of the car, $B^1$ and $B^2$ are the two arms of the dog which is clamped upon said axle by the bolts $B^3$, $B^4$, $B^5$ and $B^6$.

$C^1$ and $C^2$ are the two symmetrical halves of the hollow shaft, provided with the two projecting arms or cranks $C^3$ and $C^4$. The hollow shaft is supported in bearings not shown, but which are illustrated in the patent referred to. The hollow shaft is shown as broken off, the missing portion being an extension, which supports a gear wheel or other power transmitting device. The halves of the hollow shaft are fastened together by the bolts $C^5$ and $C^6$. The ends of the arms of the dog are formed into jaws to receive and rigidly hold the double sockets $D^1$ and $D^2$ which are secured in place by the bolts $D^3$ and $D^4$. The sockets $E^1$ and $E^2$ are attached to the horns or cranks $C^3$ and $C^4$ by means of the bolts $E^3$ and $E^4$. The said sockets $D^1$ and $D^2$, $E^1$ and $E^2$ consist of two similar halves and are provided with the spherical recesses $F^1$ and $F^2$ for the reception of the ball ended bolts to be described later. They are more particularly shown in Fig. 3, where said socket is illustrated partly in section. These halves are tightly closed and joined together by the bolts $G^1$, $G^2$, $G^3$ and $G^4$, and when said sockets are in their places at the ends of the arms of the said dog and hollow shaft, they are further closed and held firmly together by the bolts $D^3$, $D^4$, $E^3$ and $E^4$ aforesaid.

$H^1$, $H^2$, $H^3$ and $H^4$ are four ball ended helical springs, which connect all of the said four sockets together. Their construction is more particularly illustrated in Figs. 3 and 4. Referring to same it will be seen that each ball ended spring consists of the helical spring $H^5$, the two ends of which have been formed into the shape of a cone to fit into the cups $K^1$ and $K^2$. Said cups are provided with the central aperture L, the wall of which is threaded to receive the corresponding thread upon the shank of the ball ended bolt M. By this means said cup and bolt are firmly united and become the base for one end of said helical spring. Through an opening in the end of said spring the threaded portion of said bolt is introduced, and the spring, now resting in the cup shaped seat, and the ball ended bolt are united together by means of the conical washers $N^1$ and $N^2$ and the nut O, the latter being locked by the cotter pin P. These last-named members are introduced into the interior of said spring through the openings between its convolutions and when in place are easily set up by means of special tools.

The installation of this driving mechanism is extremely simple, and is as follows:—The dog being clamped upon the axle and the hollow shaft in place and connected to the generator, the driving mechanism is preferably brought from the shop in two sections, one section consisting of one socket $D^1$ and two springs $H^1$ and $H^2$ permanently connected, while the remaining two sockets are brought in their halves together with their connecting bolts. The two closed sockets with the springs attached are first placed in the jaws of the dog provided for their reception and bolted therein by the bolts $D^3$ and $D^4$. The free ends of each adjacent pair of springs are now connected together by means of the two open sockets $E^1$ and $E^2$ by inserting the ball ended bolts into the spherical recesses of the sockets and bolting the halves of the sockets together by the bolts $G^1$, $G^2$, $G^3$ and $G^4$. The sockets $E^1$ and $E^2$ are now bolted to the arms $C^3$ and $C^4$ of the hollow shaft by means of the bolts $E^3$ and $E^4$ and the installation is complete. All the parts are interchangeable and easily adjusted. No lubrication is necessary or desirable.

In operation, owing to the resiliency of the springs and the free play and motion afforded by the action of the ball and socket joints, all joltings and other disturbing motions of the running car are neutralized and their effect dissipated, and the rotary motion only of the axle is transmitted to the hollow shaft and its driving wheel, said driving wheel being enmeshed with a pinion upon the armature shaft.

In another application filed by me, and bearing Serial No. 358,587 which is a division of this application, I have claimed the spring and its attaching means as set forth herein without reference to the purpose to which it is applied. In the present application the spring and its attaching means are claimed as applied to a driving mechanism.

While the driving mechanism described in this specification is primarily intended to transmit power from a car axle to a hollow shaft, which in turn drives a generator, it may also be used in a reverse manner, that is when the generator becomes a motor and is used for propelling a car or vehicle. It may also be used in many applications wherein it is necessary to transmit power between approximately concentric shafts when a rigid connection between same is undesirable. I therefore do not wish to limit myself to any specific application of my invention, but What I do claim as novel and desire to secure by Letters Patent is:—

1. In a driving mechanism, the combination with a driving member and a driven member, of a cup carried by each of said members, a spring formed with cone shaped ends and having said ends arranged within said cups, and means arranged within said spring for fastening the ends thereof within said cups.

2. In a driving mechanism, the combination with a driving member and a driven member, of a cup carried by each of said members, a spring formed with cone shaped ends and having said ends arranged within said cups, conical washers arranged within said spring, and means connecting said washers to said cups to hold the ends of said spring between said washers and said cups.

3. In a driving mechanism, the combination with a driving member and a driven member, of a cup carried by each of said members, a spring formed with cone shaped ends and having said ends arranged within said cups, conical washers arranged within said spring and bolts connecting said washers to said cups to hold the ends of said spring between said washers and said cups.

4. In a driving mechanism, the combination with a driving member and a driven member, of a cup carried by each of said members and having a pivotal connection to each of said members, a spring formed with cone shaped ends and having said ends fitting within said cups, and means arranged within said spring for fastening the ends thereof to said cups.

5. In a driving mechanism, the combination with a driving member and a driven member, of a cup connected to each of said members by a ball and socket joint, a spring formed with cone shaped ends and having said ends arranged within said cups and means arranged within said spring for fastening the ends thereof within said cups.

6. In a driving mechanism, the combination with a driving member and a driven member, of a cup connected to each of said members by a ball and socket joint, a spring formed with cone shaped ends and having said ends fitting within said cups, conical washers arranged within said spring, and means for connecting said washers to said cups to hold the ends of said spring between said washers and said cups.

7. In a driving mechanism, the combination with a driving member and a driven member, of a cup connected to each of said members by a ball and socket joint, a spring formed with cone shaped ends and having said ends fitting within said cups, conical washers arranged within said spring, and bolts connecting said washers to said cups to clamp the ends of said spring between said washers and said cups.

8. In a driving mechanism, the combination with a driving member and a driven member, of a cup carried by each of said members, a spring formed with cone shaped ends and having said ends fitted within said cups, divided conical washers arranged within said spring and fitting the ends thereof, and bolts connecting said washers to said cups to hold the ends of said spring between said washers and said cups.

9. In a driving mechanism, the combination with a driving member and a driven member, a socket carried by each of said members, a ball arranged within each socket, a bolt extending from each ball, a cup carried by each bolt, a spring having a conical shaped end fitting within each cup, a conical shaped washer carried by each bolt and arranged within the said spring, and a nut carried upon said bolt.

10. In a driving mechanism, in combination, a hollow shaft, an interior shaft arranged within said hollow shaft, arms extending from said hollow shaft and also from said interior shaft, cups connected to said arms by ball and socket joints, a spring formed with cone shaped ends and having said ends arranged within said cups, and means arranged within said springs for fastening the ends of the same within said cups.

11. In a driving mechanism, in combination, a hollow shaft, an interior shaft arranged within said hollow shaft, arms extending from said hollow shaft and also from said interior shaft, sockets carried by each of said arms, each socket being provided with a spherical recess, a ball arranged within each recess, a bolt extending from each ball, a cup carried by each bolt, a spring formed with cone shaped ends and having said ends fitted within said cups, conical shaped washers arranged within said springs, and a nut threaded upon each bolt.

12. In a driving mechanism, in combination, an interior shaft, a hollow shaft surrounding said interior shaft, arms extending from said interior shaft and also from said hollow shaft, sockets carried by said arms, balls arranged within said sockets, bolts extending from said balls, cups and conical washers carried by said bolts, nuts threaded upon said bolts, and springs formed with cone shaped ends and having said ends secured between said washers and said cups.

13. In a driving mechanism for transmitting rotary motion, a hollow shaft provided with arms, an interior shaft spaced from said hollow shaft, a flexible connection consisting of a plurality of helical springs provided with spherical terminals, a dog clamped upon said interior shaft and provided with extensions or arms, and hollow spherical sockets carried by the arms on said hollow shaft and the arms of said dog to receive and hold the spherical terminals of said springs.

In witness whereof I have hereunto set my hand in the presence of two subscribing witnesses.

WILLIAM LORD BLISS.

Witnesses:
HARRISON G. THOMPSON, Jr.,
JOHN L. BLISS.